J. H. DRÄGER.
ARTIFICIAL BREATHING APPARATUS.
APPLICATION FILED OCT. 1, 1908.
1,049,346.
Patented Jan. 7, 1913.
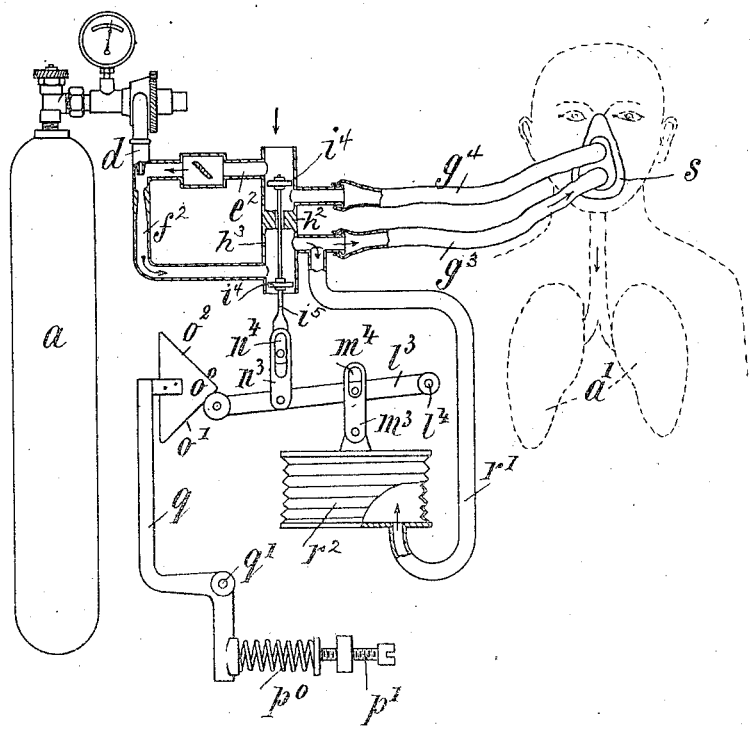
Witnesses.
Jessie N. Sutton
C. B. Sommers
Inventor.
Johann Heinrich Dräger
by Henry Orth
Atty.

UNITED STATES PATENT OFFICE.

JOHANN HEINRICH DRÄGER, OF LÜBECK, GERMANY, ASSIGNOR TO THE FIRM OF DRÄGERWERK, HEINR. & BERNH. DRÄGER, OF LÜBECK, GERMANY.

ARTIFICIAL BREATHING APPARATUS.

1,049,346.   Specification of Letters Patent.   Patented Jan. 7, 1913.

Application filed October 1, 1908. Serial No. 455,718.

*To all whom it may concern:*

Be it known that I, JOHANN HEINRICH DRÄGER, a subject of the Emperor of Germany, and resident of Lübeck, in the German Empire, have invented certain new and useful Improvements in Artificial Breathing Apparatus, of which the following is a specification.

The present invention relates to improvements in apparatus for artificially causing people to breathe.

By the aid of a breathing apparatus air or some other suitable gas is forced into the breathing organs of the body and then drawn out again by suction in a way similar to natural breathing. Apparatus of this kind known heretofore differs from the present apparatus inasmuch as in the present apparatus the air or gas conducting means for the alternate connection with the breathing organs are so arranged that the same gas driving means is used both for producing the inhaling as well as the exhaling. The pipes used are connected with a pressure and suction device in a manner to secure a reliable operation. Moreover the apparatus may be so constructed, that the change from forcing to sucking and vice versa may be obtained automatically, so that the space of time within which the inhaling and the exhaling is to be carried on can be accurately prescribed and strictly observed.

In the accompanying drawing the figure is an elevation of an apparatus for automatically changing the position of the air or gas conducting means.

The apparatus consists of pipes $e^2$ and $f^2$ which branch from a pipe $h^3$ in which an abutment $h^2$ is fixed. The pipe $e^2$ is provided with a throttling valve.

A pipe $r^1$ branches off from the pipe $g^3$ near its point of connection with the pipe $h^3$. This pipe $r^1$ leads to a bellows $r^2$, the object of which is to move the pistons $i^4$, when it is necessary to change the course of the air. The bellows $r^2$ may be connected directly with the piston rod $i^5$ or by links $m^3$ and $n^3$ and a lever 13 hereinafter more fully described to operate the pistons $i^4$.

In the position shown, air or a mixture of oxygen and air is driven to the lungs designated by $a^1$. At the same time a portion of the air is led to the bellows $r^2$ by way of the pipe $r^1$, without affecting the bellows on account of being too weak. When however, the lungs are filled the stream of air finds sufficient resistance to increase the pressure in the bellows $r^2$, which are now filled and act on the pistons $i^4$ to change their position. The result is, that a sucking action takes place to draw air from the lungs and also from the bellows. As long as the lungs are able to give air, the sucking action does not increase to such an extent as to materially decrease the pressure in the bellows. When however, the lungs are exhausted the sucking action becomes stronger and the bellows contract so as to draw the pistons into the first position. The operation is then repeated.

It is not necessary to connect the bellows with the pipe $g^3$ near the pipe $h^3$ as shown, but they may be connected with the pipe $h^3$ itself close to the pipe $g^3$ or at some other place of the pipe $g^3$, or with the mask or even with the pipe $g^4$.

If it is desired to impart a more sudden or quick movement to the pistons than is possible by the means above described the links $m^3$ and $n^3$ are provided with slots $m^4$ and $n^4$ respectively into which pins on the piston rod $i^5$ and lever $l^3$ project; which latter is pivoted to some fixed point by a pin $l^4$. A second lever $q$ is pivoted to a fixed point by a pin $q^1$, one end of this lever $q$ being acted upon by a spring $p^0$, the tension of which may be regulated by a screw $p^1$. The other end of the lever $q$ carries a wedge shaped cam $o^0$ having two surfaces $o^1$ and $o^2$ arranged at an angle to one another either of which bears against the free end of the lever $l^3$ by the pressure exerted by the spring $p^0$. The bellows are then expanded or contracted as long as the exhaling or the inhaling takes place. When the pressure or the vacuum in the bellows surpasses a certain degree, so as to move the lever $l^3$ beyond middle position the free end of it slides from the surface $o^1$ to the surface $o^2$ or vice versa, and by the tension of the spring $p^0$ the second surface standing at an angle to the horizontal plane quickly moves the bellows to suddenly operate the valve.

I claim:—

1. In an apparatus of the character described, means to give off gas under pressure, pipes to conduct the compressed gas and gas drawn by suction, a valve in the pipes, and means operated by the compressed gas and by the suction to operate the valve.

2. In an apparatus of the character described, means to give off gas under pressure, pipes to conduct the compressed gas and gas drawn by suction, a valve in the pipes, and a bellows adapted to be moved by the compressed gas and by the suction to operate the valve.

3. In an apparatus of the character described, means to give off gas under pressure, pipes to conduct the compressed gas and gas drawn by suction, a valve in the pipes, a bellows adapted to be moved by the compressed gas and by the suction and means coöperating with the bellows to impart a sudden movement to the valve.

4. In apparatus of the character described, means to give off gas under pressure, pipes to conduct the compressed gas and gas drawn by suction, a valve in the pipes, a bellows adapted to be moved by the compressed gas and by the suction to operate the valve, a lever in connection with the bellows, and a spring-pressed wedge-shaped cam acting on said lever to complete its motion and thereby operate the valve suddenly.

JOHANN HEINRICH DRÄGER.

Witnesses:
KARL BOLLMEYER,
JOHS. WULF.